(12) United States Patent
Shankarling et al.

(10) Patent No.: US 7,655,085 B2
(45) Date of Patent: Feb. 2, 2010

(54) THERMALLY STABLE ANTHRAPYRIDONE

(75) Inventors: Ganapati Subray Shankarling, Bangalore (IN); Krishnamoorthy Sivakumar, Bangalore (IN); Adil Minoo Dhalla, Mumbai (IN)

(73) Assignee: SABIC Innovative Plastics IP B.V. (NL)

( * ) Notice: Subject to any disclaimer, the term of this patent is extended or adjusted under 35 U.S.C. 154(b) by 693 days.

(21) Appl. No.: 11/314,866

(22) Filed: Dec. 22, 2005

(65) Prior Publication Data

US 2006/0106140 A1    May 18, 2006

Related U.S. Application Data

(62) Division of application No. 10/678,251, filed on Oct. 3, 2003, now Pat. No. 6,995,266.

(51) Int. Cl.
*C08L 69/00* (2006.01)
*C08K 5/3437* (2006.01)
*C07D 221/18* (2006.01)

(52) U.S. Cl. .......................... 106/218; 524/89; 546/76

(58) Field of Classification Search .................. 524/89; 546/76; 106/218
See application file for complete search history.

(56) References Cited

U.S. PATENT DOCUMENTS 7,074,265 B2 *    7/2006    Ikesu et al. .............. 106/31.47

* cited by examiner

*Primary Examiner*—Charanjit S Aulakh

(57) ABSTRACT

An anthrapyridone composition of the formula:

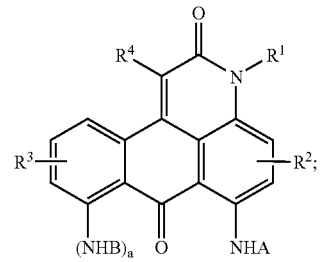

is disclosed, where "A" and "B" are independently selected from substituted or unsubstituted cyclic ketone groups having from about 10 to about 20 ring carbon atoms; "a" is an integer having a value from 0-4, $R^1$-$R^4$ are monovalent substituents; with the proviso that when "a" is 0, $R^1$ is selected from the group consisting of a hydrogen, an alkyl group, a secondary amino group and an aminosulphonyl group; and $R^2$-$R^4$ are substituents selected form the group consisting of a hydroxyl group, an aliphatic group, an aromatic group, a heterocyclic group, a halogen atom, a cyano group, a carbonyl containing group, an amino group and a sulphonyl-containing group. The anthrapyridones are useful as thermally stable colorants for producing colored polymer resins and articles that require high temperature polymer processing conditions.

21 Claims, No Drawings

THERMALLY STABLE ANTHRAPYRIDONE

CROSS REFERENCE TO RELATED APPLICATIONS

This application is a divisional of application Ser. No. 10/678,251, filed Oct. 3, 2003.

BACKGROUND

The disclosure relates generally to anthrapyridone compositions and methods for their preparation. The anthrapyridone compositions disclosed herein are useful as colorants in resin compositions.

Colored resin compositions are generally prepared by incorporating the colorant material in the resin matrix in a processing step using techniques, such as extrusion or molding. The method of incorporating the colorant material depends upon, among other conditions, the nature of the resin matrix. For resins that require high processing temperatures of about 350° C. or higher, it is necessary that the colorant material be thermally stable at these higher processing temperatures. Examples of resins that require processing temperatures of about 350° C. or higher include high heat polycarbonates, which have glass transition temperatures greater than that of bisphenol A homopolycarbonate, and polyetherimides, such as ULTEM™. Another issue with using colorants under such high temperature processing conditions is that the processed resins sometimes exhibit a color which is different from that expected based on the color of the colorant material used. This color shift generally occurs as a result of the thermal instability of the colorant material.

Therefore, there is a need for thermally stable colorant materials that are resistant to degradation and color shift when processed with resins at elevated temperatures. Such thermally stable colorants are preferably weatherable. That is, the colorant withstands degradation brought about by environmental factors, such as atmospheric air, moisture, and sunlight.

BRIEF DESCRIPTION

Disclosed herein are thermally stable anthrapyridone compositions. One embodiment of the present disclosure is an anthrapyridone of the formula:

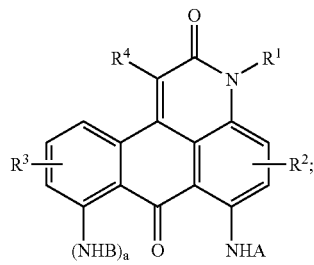

where "A" and "B" are independently selected from substituted or unsubstituted cyclic ketone groups having about 10 to about 20 ring carbon atoms; "a" is an integer having a value from 0-4, $R^1$-$R^4$ are monovalent substituents; with the proviso that when "a" is 0, $R^1$ is selected from the group consisting of a hydrogen, an alkyl group, a secondary amino group and a sulphonyl-containing group; $R^2$-$R^4$ are substituents selected form the group consisting of a hydroxyl group, an aliphatic group, an aromatic group, a heterocyclic group, a halogen atom, a cyano group, an amino group, and a sulphonyl-containing group.

A method for producing a molded thermoplastic resin composition comprises: heating a mixture comprising at least one thermoplastic resin and an anthrapyridone colorant; wherein the anthrapyridone colorant has the formula,

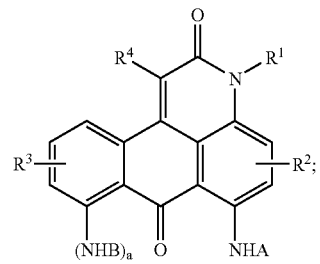

wherein "A" and "B" are independently selected from substituted or unsubstituted cyclic ketone groups having from about 10 to about 20 ring carbon atoms; "a" is an integer having a value from 0-4, and $R^1$-$R^4$ are monovalent substituents; with the proviso that when "a" is 0, $R^1$ is selected from the group consisting of a hydrogen, an alkyl group, a secondary amino group, and a sulphonyl-containing group; and $R^2$-$R^4$ are substituents selected form the group consisting of a hydroxyl group, an aliphatic group, an aromatic group, a heterocyclic group, a halogen atom, a cyano group, an amino group, and a sulphonyl-containing group; and extruding the mixture.

In another embodiment, a method of preparing an anthrapyridone composition comprises: reacting in the presence of a catalyst composition and an acid scavenger, a haloanthrapyridone compound with an amine compound comprising a cyclic ketone group; or reacting in the presence of a catalyst composition and an acid scavenger, an aminoanthrapyridone compound with an organohalogen compound comprising a cyclic ketone group; where the anthrapyridone composition is of the formula:

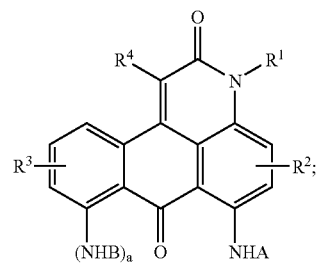

where "A" and "B" are independently selected from substituted or unsubstituted cyclic ketone groups having from about 10 to about 20 ring carbon atoms; "a" is an integer having a value from 0-4, $R^1$-$R^4$ are monovalent substituents; with the proviso that when "a" is 0, $R^1$ is selected from the group consisting of a hydrogen, an alkyl group, a secondary amino group and an sulphonyl-containing group; and $R^2$-$R^4$ are substituents selected from the group consisting of a hydroxyl group, an aliphatic group, an aromatic group, a heterocyclic group, a halogen atom, a cyano group, an amino group, and a sulphonyl-containing group.

The present disclosure may be understood more readily by reference to the following detailed description of the various features of the disclosure and the examples included therein.

DETAILED DESCRIPTION

The previously described embodiments of the present disclosure have many advantages, including new anthrapyridone compounds, facile methods for their preparation, and use as thermally stable colorants for extruded or molded polymer compositions. As defined herein, the term "thermally stable" means that the colorant is stable to degradation at temperatures less than or equal to about 450° C.

The anthrapyridone compositions disclosed herein are represented by the general formula (I):

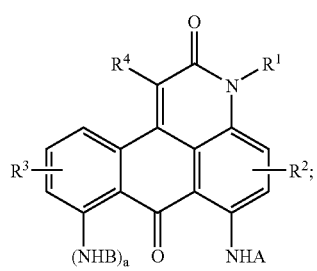

(I)

where "A" and "B" are independently selected from substituted or unsubstituted cyclic ketone groups having about 10 to about 20 ring carbon atoms; "a" is an integer having a value from 0-4, $R^1$-$R^4$ are monovalent substituents; with the proviso that when "a" is 0, $R^1$ is selected from the group consisting of a hydrogen, an alkyl group, a secondary amino group and a sulphonyl-containing group; $R^2$-$R^4$ are substituents selected form the group consisting of a hydroxyl group, an aliphatic group, an aromatic group, a heterocyclic group, a halogen atom, a cyano group, an amino group, and a sulphonyl-containing group.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Unless otherwise specified, the term "aliphatic" or "alkyl" as used herein is intended to designate straight chain alkyls, branched alkyls, aralkyls, cycloalkyls, and bicycloalkyl groups. The straight chain and branched alkyl groups include as illustrative non-limiting examples, methyl ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl groups represented are those containing about 3 to about 12 ring carbon atoms. Some illustrative non-limiting examples of these cycloalkyl groups include cyclobutyl, cyclopentyl, cyclohexyl, methylcyclohexyl, and cycloheptyl. In various other embodiments, aralkyl groups are those containing about 7 to 14 carbon atoms; these include, but are not intended to be limited to, benzyl, phenylbutyl, phenylpropyl, and phenylethyl. In various other embodiments, the term "aryl" or "aromatic" groups are intended to designate monocyclic or polycyclic moieties containing about 6 to about 12 ring carbon atoms. Some illustrative non-limiting examples of these aromatic groups include phenyl, biphenyl, and naphthyl.

Various structural possibilities exist for the anthrapyridones represented by the general formula (I). In one embodiment, the groups "A" and "B" in formula (I) are independently selected from the group consisting of substituted and unsubstituted anthraquinonyl, naphthoquinonyl and benzanthronyl groups since these type of compounds exhibit or potentially exhibit resistance to thermal degradation at temperatures of about 350° C., or higher. Furthermore, the raw materials for preparing these compounds, particularly the case where "A" is an anthraquinonyl group are readily available, thereby leading to a facile synthesis. The synthetic methods to prepare the anthrapyridone compositions of formula (I) are described further below in this disclosure.

When "a" in formula (I) is an integer having a value from 1-4, $R^1$-$R^4$ can be any monovalent substituent. In many embodiments, $R^1$-$R^4$ are independently selected from the group consisting of a hydrogen, a hydroxyl group, an aliphatic group, an aromatic group, a heterocyclic group, a halogen atom, a cyano group, an amino group, and a sulphonyl-containing group. Non-limiting examples of sulfonyl-containing groups include —$NR^5SO_2R^6$, —$CONHSO_2R^6$, and —$SO_2NHCO6^1$; —$SO_2$ where $R^5$ is individually selected from the group consisting of hydrogen, an aliphatic group, an aromatic group, and a heterocyclic group; and $R^6$ is selected from the group consisting of an aliphatic group, an aromatic group and a heterocyclic group.

However, when "a" in formula (I) has a value of 0, $R^1$ is independently selected from the group consisting of a hydrogen, an aliphatic group, an alkyl group, a secondary amino group, and an sulfonyl-containing group; and $R^2$-$R^4$ are independently selected from the consisting of a hydroxyl group, an aliphatic group, an aromatic group, a heterocyclic group, a halogen atom, a cyano group, an amino group, and a sulfonyl-containing group.

In a preferred embodiment, "A" and "B" are independently selected from the group consisting of substituted and unsubstituted anthraquinonyl; "a" is 0, $R^1$-$R^3$ are independently selected from the group consisting of hydrogen and $C_1$-$C_4$-alkyl; and $R^4$ is a substituted or an unsubstituted aryl group. A representative example of this sub-class of anthrapyridones is 3'-Phenyl-2-methyl-4-(anthraquinoneamino)-1,9-anthrapyridone.

In accordance with one embodiment, the anthrapyridone compositions of the present disclosure can be prepared by reacting a haloanthrapyridone compound with an amine compound comprising a cyclic ketone group in the presence of a catalyst composition and an acid scavenger. Suitable haloanthrapyridones are represented by the general formula (II):

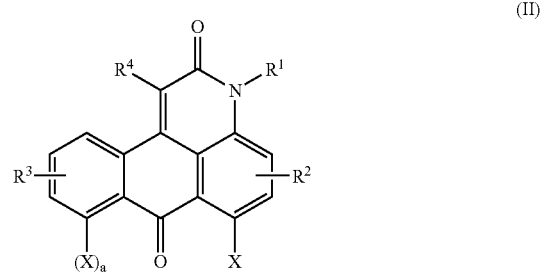

(II)

where "X" is a halogen atom (chlorine, bromine, or iodine), and "a" and $R^1$-$R^4$ are as defined previously for formula (I). The haloanthrapyridones can be obtained by methods known in the art, such as for example, the method disclosed in U.S. Pat. No. 4,386,206. For example, the bromoanthrapyridone shown in formula (III)

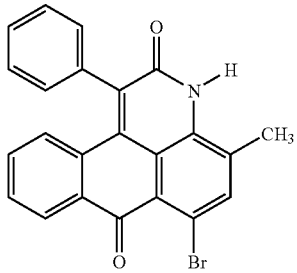
(III)

can be prepared by a 3-step sequence starting from 1-amino-2-methylanthraquinone by bromination in acetic acid to furnish 1-amino-2-methyl-4-bromoanthraquinone, reaction with phenylacetyl chloride in N,N-dimethylformamide solvent to give the corresponding N-phenylacetyl derivative, and treatment with sodium hydroxide in ethanol solvent to provide (III)

Another example of suitable haloanthrapyridones are those of the formula (IV):

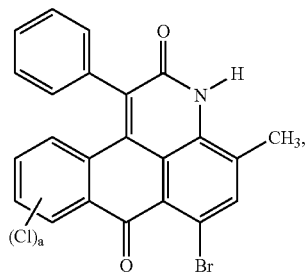
(IV)

where "a" can have values of from 1 to 4. Suitable starting materials for preparing the compounds of formula (IV) are halophthalic anhydrides, such as monochloro-, dichloro-, trichloro-, and tetrachlorophthalic anhydride. Using known methods, the anhydride portion can then be elaborated to arrive at the anthrapyridones of formula (IV).

Suitable amine compounds are of the formula $A-NH_2$ and $B—NH_2$, wherein "A" and "B" represent a substituted or an unsubstituted cyclic ketone having from 10 to 20 ring carbon atoms. Such amino compounds can be prepared by methods well known in the art, such as those disclosed in U.S. Pat. No. 5,132,437. Exemplary amine compounds include the aminoanthraquinones, such as 1-aminoanthraquinone. The reaction of the amine compound with the haloanthrapyridone is preferably carried out in a dipolar aprotic solvent. Preferred dipolar aprotic solvents include one or more solvents selected from the group consisting of halogen-containing hydrocarbons, such as 1,2-dichlorobenzene, 1,2,4-trichlorobenzene, and the like; amide solvents, such as N,N-dimethylformamide, N-methyl-3-pyrrolidinone, 1,3-dimethyl-2-imidazolidinone, and N,N-dimethylacetamide; dimethyl sulfoxide, and sulfolane.

In accordance with another embodiment, the anthrapyridones can be prepared by reacting an aminoanthrapyridone compound with an organohalogen compound comprising a cyclic ketone group in the presence of a catalyst composition and an acid scavenger. The aminoanthrapyridone compound is represented by the general formula (IV);

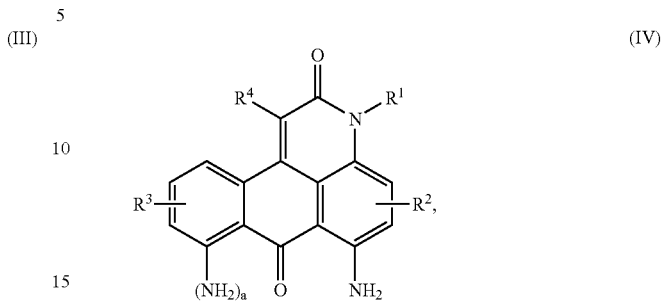
(IV)

where "a" and $R^1$-$R^4$ are as defined previously for formula (I). Aminoanthrapyridones can be prepared by methods known in the art, such as those disclosed in Khimiya Geterotsiklicheskikh Soedinenii (1972), (12), page numbers 1651-5. A suitable aminoanthrapyridone is shown in formula (V)

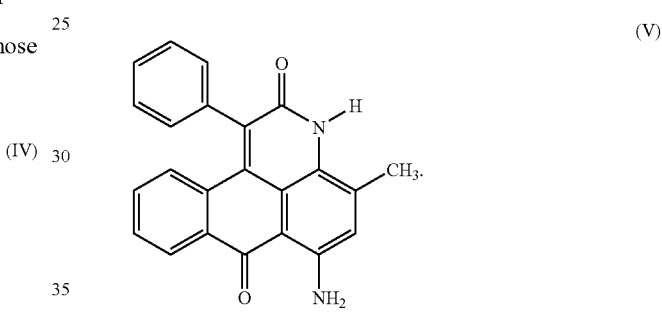
(V)

The organohalogen compound comprises a substituted or unsubstituted cyclic ketone of the formula A-X or B—X, wherein "A" and "B" represent a substituted or unsubstituted cyclic ketone having from about 10 to 20 ring carbon atoms; and "X" is a halogen preferably selected from the group consisting of chlorine, bromine and iodine. Such organohalogen compounds can be prepared by methods well known in the art, such as those disclosed in U.S. Pat. No. 5,132,437. Suitable examples of such compounds include the haloanthraquinones, such as 1-chloroanthraquinone and 1-bromoanthraquinone. The reaction of the organohalogen compound with the aminoanthrapyridone is preferably carried out in a dipolar aprotic solvent as described previously.

The reaction of the amine compound with the haloanthrapyridone is preferably carried out in a dipolar aprotic solvent. In general, the reaction of the haloanthrapyridone with the amine compound or the aminoanthrapyridone with the organohalogen compound is carried out at a temperature of about 50° C. to about 230° C., and preferably at a temperature of about 150° C. to about 230° C. The time required for the reaction is about 8 hours to about 48 hours, and more preferably is about 12 hours to about 24 hours.

For both methods, the catalyst composition preferably comprises either copper metal or a copper salt. Copper salts are preferably selected from the group consisting of copper(I) halide or a copper(II) halide. Other copper salts such as the organic acid salts as exemplified by copper(II) acetate can also be used. The amount of the catalyst composition employed comprises about 0.005 to about 0.2 moles per mole of the aminoanthrapyridone or haloanthrapyridone used.

Acid scavengers are preferably employed in either embodiment for preparing the anthrapyridones. Suitable acid scavengers include but are not intended to be limited to alkali metal carbonates, alkaline earth metal carbonates, alkali metal bicarbonates; alkaline earth metal bicarbonates, alkali metal carboxylates, and alkaline earth metal carboxylates having the general formula $M(COOR^7)_n$, wherein "M" is an alkali metal or an alkaline earth metal, $R^7$ is a monovalent alkyl group having from about 1 to about 6 carbons, and "n" is selected from 1 and 2.

The methods described hereinabove can be conducted either in a batch process, or with suitable modifications, as would be apparent to those skilled in the art, in a semi-continuous process or a continuous process.

The anthrapyridones disclosed herein are valuable as colorants, particularly as thermally stable colorants for incorporation in polymer resin compositions during polymer molding and/or extrusion processing. As such, the colorants are attractive materials for use with polymers having high glass transition temperatures and/or high processing temperatures. The thermally stable colorants disclosed herein are suitable for use in polymer processing equipment, such as molding machines and extruders at temperatures less than or equal to about 450° C., and more preferably at about 250° C. to about 450° C. Additionally, the anthraquinone colorants are valuable for other previously known applications for anthrapyridone compounds, which include use in dyeing, as printing inks, for coloring polymers, and others. In another embodiment, the disclosure encompasses all known uses of anthrapyridone compounds in addition to its application as a thermally stable high-temperature colorant for preparing colored polymer resin compositions. Further, the anthrapyridones of the present disclosure exhibit decreased solubility in most of the commercially used solvents, such as alcohols, chlorinated solvents like dichloroethane and dichloromethane, dimethylsulfoxide, ethyl acetate, acetone. Hence, they can be used without using such solvents, thereby rendering them environment-friendly. In other words, the anthrapyridones are used in the solid state when molded or extruded with, for example a polymer resin.

In another embodiment, the anthrapyridones can also be rendered soluble or partly soluble in common organic solvents by suitably modifying the substituents on the anthrapyridone ring. Suitable modifications may also include modifying the chain length of the various alkyl group substituents. The synthesis of such soluble anthrapyridones can be achieved by employing the synthetic methods described in this disclosure. Such soluble anthrapyridones can be used in a variety of applications, such as, for example, additives for petroleum products and/or brake fluids.

The anthrapyridone compositions provide excellent heat resistance and colored molded articles superior in light resistance, bleeding resistance, extraction resistance, sublimation resistance, and the like, when used as a coloring agent. Accordingly, they are useful for preparing colored polymer resin compositions. The polymer resin can comprise one or more thermoplastic and/or thermoset resins. Non-limiting examples of thermoplastic resins that can be used include polystyrene, poly(methylmethacrylate), poly(vinyl chloride), acrylonitrile-butadiene-styrene copolymer (also commonly called ABS), acrylonitrile-styrene-acrylate copolymer (also commonly called ASA), styrene-acrylonitrile copolymer (also called SAN), polycarbonate, poly(phenyleneoxide), polyolefins, such as polypropylene and polyethylene; poly(acrylonitrile), polyamide, polyacetal, polyesters such as poly(ethyleneterephthalate) and poly(butyleneterephthalate); and any mixture of the foregoing thermoplastic polymers. Among the thermoset resins, non-limiting resins include phenolic resins, urea resins, melamine resins, unsaturated polyester resins, epoxy resins, poly(diallylphthalate) resin, and the like.

Colored polymer compositions are generally obtained by blending the anthrapyridone coloring agent with resins in a suitable manner, and subjecting the resulting blend to a molding step using techniques, such as injection molding, extrusion, and melt-spinning. For instance, pellets or powders of the resin are mixed with a pulverized coloring agent in a suitable mixer and then the mixture is treated in a kneader, roller mill, Banbury mixer, extruder, or the like, until the coloring agent is dissolved or dispersed in the resin. The amount of coloring agent in the resin composition is not critical, but generally it is sufficient to use about 0.01 to 5 weight percent, and preferably about 0.01 to about 1 weight percent of the colorant, relative to the weight of the polymer resin. If desired, the resulting colored resin composition can be further subjected to a molding step to make colored molded articles using techniques such as, compression molding, injection molding, and blow molding. Alternatively, the coloring agent is mixed with a monomer containing a polymerization catalyst, followed by polymerization to obtain a colored thermoplastic or thermosetting resin The anthrapyridones disclosed herein can also be used optionally with other colorants (pigments and dyes, for example), filler materials, and additives known in the art. Additives may include, for example, stabilizers, mold release agents, processing aids, flame retardants, drip retardants, nucleating agents, UV blockers, dyes, pigments, particulate, conductive fillers (e.g., conductive carbon black, and carbon nanotubes having an average diameter of about 1 to about 500 nanometers), reinforcing fillers, antioxidants, anti-static agents, blowing agents, and the like. Reinforcing fillers may include, for example, inorganic and organic materials, such as fibers, woven fabrics and non-woven fabrics of the E-, NE-, S-, T- and D-type glasses and quartz; carbon fibers, including poly(acrylonitrile) (PAN) fibers, carbon nanotubes, and especially graphitic carbon nanotubes; potassium titanate single-crystal fibers, silicon carbide fibers, boron carbide fibers, gypsum fibers, aluminum oxide fibers, asbestos, iron fibers, nicked fibers, copper fibers, wollastonite fibers; and the like. The reinforcing fillers may be in the form of glass roving cloth, glass cloth, chopped glass, hollow glass fibers, glass mat, glass surfacing mat, and non-woven glass fabric, ceramic fiber fabrics, and metallic fiber fabrics. In addition, synthetic organic reinforcing fillers may also be used including organic polymers capable of forming fibers. Illustrative examples of such reinforcing organic fibers are poly(ether ketone), poly(phenylene sulfide), polyesters, aromatic polyamides, aromatic polyimides or polyetherimides, acrylic resins, and poly(vinyl alcohol). Fluoropolymers such as polytetrafluoroethylene may be used. Also included are natural organic fibers known to one skilled in the art, including cotton cloth, hemp cloth, and felt, carbon fiber fabrics, and natural cellulosic fabrics, such as Craft paper, cotton paper, and glass fiber containing paper. Such reinforcing fillers could be in the form of monofilament or multifilament fibers and could be used either alone or in combination with another type of fiber, through, for example, co-weaving or core-sheath, side-by-side, orange-type, or matrix and fibril constructions, or by other methods known to one skilled in the art of fiber manufacture. They may be in the form of, for example, woven fibrous reinforcements, non-woven fibrous reinforcements, or papers. Talc and mica can also be used as a reinforcing filler. In addition, other types of usually used for coloring resin may be additionally used. For example, opaque colored articles can be obtained by adding 0.1-1% by weight of titanium oxide.

The disclosure is explained in more detail with reference to the following non-limiting Examples, which are only illustrative, but not limitative.

EXAMPLES

Example 1

This Example describes the preparation of 3'-Phenyl-2-methyl-4-(aminoanthraquinone)-1,9-anthrapyridone A mixture of 3'-phenyl-2-methyl-4-bromo-1,9-anthrapyridone (28 grams), 1-aminoanthraquinone (15 grams), sodium carbonate (8.4 grams), sodium acetate (1.8 grams), cuprous chloride (0.3 grams), and 1,2-dichlorobenzene (350 milliliters) was stirred under reflux (solution temperature was about 180° C.) for about 18 hours. The reaction mixture was then cooled to about 60° C., diluted with methanol (60 milliliters), and stirred for about 2 hours. Then the mixture was filtered, and the filter cake was washed successively with hot dilute hydrochloric acid, water, methanol, and air-dried. The filter cake was suspended in N,N-dimethyl formamide (80 milliliters), heated to about 80° C., and stirred for about 1 hour. The solid product was then filtered, washed successively with water, and methanol, and dried in a vacuum oven maintained at about 120° C. for about 8 hours to give the desired product in a yield of 24 grams.

Comparative Example 1

This Example describes the preparation of 3'-Phenyl-2-methyl-4-(4-methylanilino)-1,9-anthrapyridone using sodium carbonate as catalyst.

A mixture of 3'-phenyl-2-methyl-4-bromo-1,9-anthrapyridone (5 grams), p-toluidine (20 grams), and sodium carbonate (1 gram) was heated to about 180-185° C. for about 15 hours. The resulting mixture was cooled to about 60° C., diluted with methanol (20 milliliters), and cooled to about 20° C. The solid material was filtered, and washed with methanol. The solid filter cake was treated with 5 weight percent aqueous hydrochloric acid, heated to boil, and stirred for about 2 hours. This mixture was then filtered, washed with water until the washings were free of acid, and dried. The yield of the desired product thus obtained was 4.2 grams.

Comparative Example 2

This Example describes the preparation of 3'-Phenyl-2-methyl-4-(4-acetamidylanilino)-1,9-anthrapyridone using sodium carbonate as acid scavenger and cupric acetate as catalyst.

A mixture of 3'-phenyl-2-methyl-4-bromo-1,9-anthrapyridone (9.75 gms), 4-amino acetanilide (9 grams), potassium acetate (4.5 grams), cupric acetate (0.275 grams), and xylene (70 milliliters) was stirred under reflux for about 18 hours. The resulting reaction mixture was then cooled to about 60° C., diluted with methanol (50 milliliters), and stirred at about 55-60° C. for about 2 hours; filtered, washed with hot dilute hydrochloric acid, water, methanol, and dried. The dry filter cake was further dried in a vacuum oven maintained at about 120° C. for about 8 hours to yield the desired product in a yield of 8.5 grams.

Comparative Example 3

This Example describes the preparation of 3-Phenyl-2-methyl-4-(2,5-dimethoxyanilino)-1,9-anthrapyridone using sodium carbonate as acid scavenger and cupric acetate as catalyst.

The procedure used was the same as described for Comparative Example 2, except that 3'-phenyl-2-methyl-4-bromo-1,9-anthrapyridone (8.2 grams), 2,5-dimethoxyaniline (5 grams), potassium acetate (3.3 grams), cupric acetate (0.3 grams), and xylene (70 milliliters) were used. The yield of product was 7.4 grams.

Comparative Example 4

This Example describes the preparation of 3'-Phenyl-2-methyl-4-(4-butoxyanilino)-1,9-anthrapyridone using sodium carbonate as acid scavenger and cupric acetate as catalyst.

The procedure used was the same as described for Comparative Example 2, except that 3'-phenyl-2-methyl-4-bromo-1,9-anthrapyridone (2 grams), 4-butoxyaniline (1.6 grams), potassium acetate (0.7 grams), cupric acetate (0.1 grams), and xylene (15 milliliters) were used. The yield of product was 1.9 grams.

Example 2

This Example describes the general procedure used for prepared extruded polymer samples incorporating the colorants described above.

A 1 kilogram sample of bisphenol A homopolycarbonate and the anthrapyridone colorant, such that the anthrapyridone comprised about 0.04 weight percent of the overall sample, was taken in a polyethylene bag and shaken vigorously for about 3-4 minutes. The resulting material was then compounded using a W & P ZSK-25 Mega Compounder under vacuum at the conditions specified in Table 1 to produce colored polymer pellets.

TABLE 1

| | |
|---|---|
| Feed zone temperature (° C.) | 128 |
| Zone 1 temperature (° C.) | 280 |
| Zone 2 temperature (° C.) | 285 |
| Zone 3 temperature (° C.) | 285 |
| Zone 4 temperature (° C.) | 290 |
| Throat/Die temperature (° C.) | 290 |
| Screw speed (Revolutions per minute) | 300 |
| Temperature of Melt (° C.) | 300 |
| Torque (Nm) | 58-62 |

Example 3

This Example describes the general procedure used for producing molded chips from the extruded pellets prepared as described in Example 2.

The extruded pellets prepared as described in Example 2 was dried in an oven maintained at 120° C. for about 4 hours. Then the dried pellets were subjected to molding using a LTM-Demag molding machine at the conditions shown in Table 2.

TABLE 2

| | |
|---|---|
| Feed zone temperature (° C.) | 110 |
| Zone 1 temperature (° C.) | 300 |

TABLE 2-continued

| | |
|---|---|
| Zone 2 temperature (° C.) | 290 |
| Zone 3 temperature (° C.) | 275 |
| Nozzle Temperature (° C.) | 295 |
| Temperature of Melt (° C.) | 300 |
| Mold temperature (° C.) | 85 |
| Sample drying time (hours) | 4 |
| Sample drying temperature (° C.) | 120 |
| Cycle time (seconds) | 125 |
| Injection time (seconds) | 1.2 |
| Injection speed (revolutions per minute) | 25 |
| Injection pressure (bar) | 50 |
| Screw speed (Revolutions per minute) | 300 |
| Holding pressure (bar) | 40 |
| Holding time (seconds) | 10 |
| Cooling time (seconds) | 15 |
| Thickness of step chip inserts (millimeters) | 1, 2, and 3 |
| Thickness of single insert (millimeters) | 2.54 |

Example 4

The molded chips incorporating the anthrapyridone compound of Example 1 as colorant were subjected to a weatherability test by using an Atlas Ci4000 weatherometer following ASTM D4459 test method. The D65 illuminator was used since it most closely simulates natural sunlight. After being exposed for about 300 hours, the color of the sample was analyzed in the transmittance mode using a Macbeth Color Eye 7000A instrument equipped with an integrating sphere. The settings used included an observer of 10 degrees, a color space from about 360 nanometers to about 760 nanometers, and the specular component. The results are shown in Table 1. Sample measurements were made at exposure times of zero (that is, before being placed in the Weatherometer), 100, 200, and 300 hours of exposure. The various parameters shown in Table 3 are: L: Lightness; a*: redness-greenness, b*: yellowness-blueness; and C*: chroma; H*: hue; $\Delta L$: difference in lightness before and after exposure in weatherometer; $\Delta a^*$, $\Delta b^*$, and $\Delta C^*$ represent the difference in difference in values for the a*, b*, and C*, respectively, before and after the exposure in weatherometer; $\Delta H^*$: difference in hue before and after exposure in weatherometer; and $\Delta E^*$, which represents the total color difference between the values obtained from before and after exposure in the weatherometer. $\Delta E^*$ is derived from the $\Delta a^*$, $\Delta b^*$, and $\Delta L^*$ values, as shown in equation (1):

$$\Delta E^* = [(\Delta L^*)^2 + (\Delta a^*)^2 + (\Delta b^*)^2]^{1/2} \quad (1).$$

A negative $\Delta L$ indicates a darker sample relative to a control sample, while a positive $\Delta L$ indicates a relatively lighter sample. A control sample is one that was not subjected to the weatherability test. A negative $\Delta a^*$ indicates a sample which is less red than the reference sample, while a positive $\Delta a^*$ indicates that the sample is relatively more red. A negative $\Delta b^*$ indicates a sample which is less yellow than the reference sample, while a positive $\Delta a^*$ indicates that the sample is relatively more yellow. $\Delta C^*$ is related to $\Delta a^*$ and $\Delta b^*$ by equation 2:

$$\Delta C^* = [(\Delta a^*)^2 + (\Delta b^*)^2]^{1/2} \quad (2)$$

The $\Delta E^*$ gives an overall measure of the weatherability of the colorant sample. For the purposes of this disclosure, if $\Delta E^*$ is less than about 1.0, it is taken to imply that the colorant sample has good weatherability characteristics. Likewise, a value for $\Delta C^*$ of less than 0.1 is taken to imply that the brightness of the color is not significantly reduced. It is clear from the data shown in Table 3 that the molded chips prepared using the anthrapyridone of Example 1 maintained excellent color and color brightness, as seen from the low values of $\Delta E^*$ (about 0.56) and $\Delta C^*$ (about −0.05), even after 300 hours of exposure in the weatherometer.

The anthrapyridone compounds obtained from the Example and Comparative Examples described above were then subjected to thermogravimetric analysis (also referred to as "TGA"), which measures the amount of weight change in a material as a function of temperature in a controlled atmosphere. TGA analyses were carried out using a TGA 2950 instrument equipped with an auto sampler, and available from TA Instruments. TGA can be carried out either using a programmed temperature setting whereby the sample is heated at a pre-determined rate, or the sample is subjected to a constant temperature (isothermal conditions). In the present disclosure, the sample was equilibrated to an initial temperature of 40° C., then heated at the rate of 10° C. per minute upto a maximum temperature of 500° C., and thereafter equilibrated at 500° C. under a nitrogen atmosphere. The weight of the sample was monitored continuously throughout this process. The technique measures any weight change that can occur during the heating process. Any weight loss is generally indicative of decomposition or degradation of the sample. This technique was used to measure the thermal stability of the anthrapyridones disclosed herein. The thermal stability data in turn was used to identify anthrapyridones that can be beneficially used as colorants for preparing colored polymer resin compositions by polymer processing techniques. In general, the higher the decomposition temperature of a colorant sample, the higher will be its suitability as a colorant for high temperature polymer processing for producing colored polymer resin compositions. The TGA experiment gives a weight loss—temperature curve. The TGA results are expressed in terms of $T_d$ (also called Decomposition Onset Temperature). For the purposes of this disclosure, $T_d$ represents the inflection point on the weight loss—temperature curve. In other words, $T_d$ is the temperature corresponding to the point at which the tangent to the curve has the highest slope. The results are shown in Table 4 in which Comparative Example 5 represents the TGA measurement carried out with Solvent Red 52 (available from suppliers, such as Skychem, Clariant, and Bayer). The results clearly show that the anthrapyridone of Example 1 is far superior to all the other colorant candidates of Comparative Examples 1 through 5, not only in having the highest $T_d$, but also in exhibiting no color shift after the molding step. In fact, since the colorants of Comparative Examples 1 through 5 underwent a color shift from red to reddish—orange during the molding step, the weatherability tests on such molded chips could not be performed to further evaluate the weatherability of these colorants using the procedure of Example 4. Furthermore, the molded polymer chips incorporating the colorant of Example 1 exhibits excellent weatherability as shown in Table 3, where the value of $\Delta E^*$ is only 0.558, and the change in chroma (or brightness) is only around −0.05 after 300 hours of exposure in the weatherometer. Therefore, such colorants are very useful for producing colored polymer resin compositions and articles, particularly for outdoor applications, based on engineering thermoplastics that require relatively high temperature processing conditions.

13

TABLE 3

| Exposure (hours) | ΔL | Δa* | Δb* | ΔC* | Δh* | ΔE* |
|---|---|---|---|---|---|---|
| 100 | −0.072 | 0.117 | −0.217 | −0.068 | −0.207 (darker) | 0.23 |
| 200 | 0.32 | −0.117 | 0.347 | 0.026 | 0.365 (lighter) | 0.486 |
| 300 | 0.292 | −0.232 | 0.415 | −0.053 | 0.472 (lighter) | 0.558 |

TABLE 4

| Example Number | Initial color of chloroform solution of colorant | Final color of molded colored chip | ($T_d$) (° C.) | Weight percent loss of sample at 400° C. |
|---|---|---|---|---|
| 1 | Red (suspension) | Red | 415 | 0.75 |
| 1* | Red | Reddish orange | 383 | 29 |
| 3* | Red | Reddish orange | 372 | 12 |
| 4* | Red | Reddish orange | 370 | 21 |
| 5* | Red | Reddish orange | 350 | >40 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A resin composition comprising an anthrapyridone of the formula,

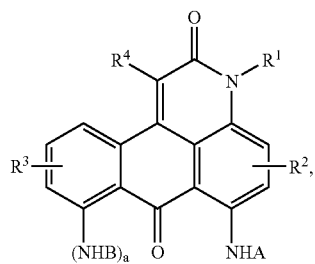

wherein "A" is independently selected from substituted or unsubstituted anthraquinonyl groups; further wherein "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups.

2. The resin composition of claim 1, comprising at least one thermoplastic and/or thermoset resin.

3. The resin composition of claim 2, wherein said thermoplastic resin is selected from the group consisting of polyesters, polyarylates, polycarbonates, polyamides, polyimides, polyamideimides, polystyrenes, rubber-modified polystyrenes, nitrile polymers, polyarylene ethers, and combinations of the foregoing thermoplastic resins.

4. An article comprising the resin composition of claim 1.

14

5. A method for producing a molded thermoplastic resin composition, said method comprising:
heating a mixture comprising at least one thermoplastic resin and an anthrapyridone colorant; wherein said anthrapyridone colorant has the formula,

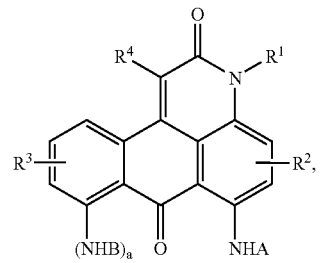

wherein "A" is independently selected from substituted or unsubstituted anthraquinonyl groups; further wherein "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups; and
extruding said mixture.

6. The method of claim 5, wherein said heating the mixture is at a temperature of about 200° C. to about 450° C.

7. The method of claim 5, wherein said at least one thermoplastic resin is selected from the group consisting of polyesters, polyarylates, polycarbonates, polyamides, polyimides, polyamideimides, polystyrenes, rubber-modified polystyrenes, nitrile polymers, and polyarylene ethers.

8. The method of claim 7, wherein said polycarbonate comprises bisphenol A homopolycarbonate.

9. A method of preparing an anthrapyridone composition comprising:
reacting a haloanthrapyridone compound with an amine compound comprising a cyclic ketone group in the presence of a catalyst composition and an acid scavenger, wherein said anthrapyridone composition is of the formula,

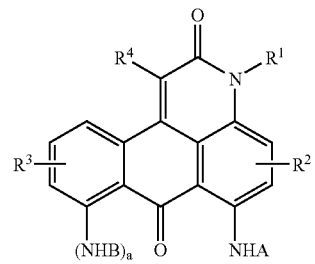

wherein "A" is independently selected from substituted or unsubstituted anthraquinonyl groups; further wherein "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups.

10. The method of claim 9, wherein said haloanthrapyridone comprises a compound of the formula,

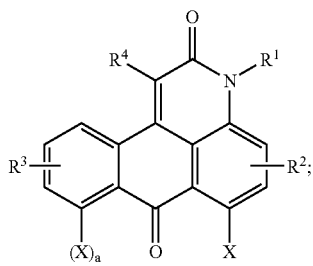

wherein "X" is a halogen atom, "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups.

11. The method of claim 9, wherein said amine compound is a substituted or an unsubstituted aminoanthraquinone.

12. The method of claim 9, wherein reacting said haloanthrapyridone compound with said amine compound is at a temperature of about 50° C. to about 230° C.

13. The method of claim 9, wherein reacting said haloanthrapyridone compound with said amine compound is for a reaction time of about 8 hours to about 48 hours.

14. The method of claim 9, wherein said catalyst composition comprises copper metal or a copper salt.

15. The method of claim 9, wherein said catalyst composition comprises about 0.005 to about 0.2 moles per mole of said haloanthrapyridone.

16. The method of claim 9, wherein said acid scavenger comprises alkali metal carbonates, alkaline earth metal carbonates, alkali metal bicarbonates; alkaline earth metal bicarbonates, and alkali metal carboxylates, and alkaline earth metal carboxylates having the general formula $M(COOR^7)_n$; wherein "M" is an alkali metal or an alkaline earth metal, $R^7$ is a monovalent alkyl group having from about 1 to about 6 carbon atoms, and "n" has a value of 1 or 2.

17. A method of preparing an anthrapyridone composition comprising:
reacting an aminoanthrapyridone compound with an organohalogen compound comprising a cyclic ketone group in the presence of a catalyst composition and an acid scavenger;
wherein said anthrapyridone composition is of the formula,

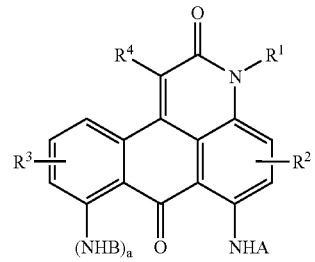

wherein "A" is independently selected from substituted or unsubstituted anthraquinonyl groups; further wherein "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups.

18. The method of claim 17, wherein said aminoanthrapyridone comprises compounds of the formula,

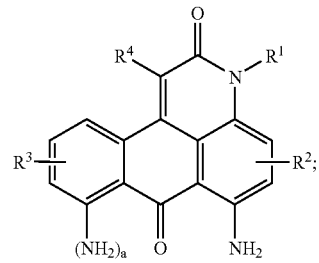

wherein "a" is 0, $R^1$ is selected from the group consisting of a hydrogen, an alkyl group, a secondary amino group, and a sulphonyl-containing group; and $R^2$ and $R^3$ are substituents selected form the group consisting of a hydroxyl group, an aliphatic group, an aromatic group, a heterocyclic group, a halogen atom, a cyano group, an amino group, and a sulphonyl-containing group; and R4 is selected from substituted or unsubstituted aryl groups.

19. The method of claim 17, wherein said organohalogen compound is a substituted or unsubstituted halogenoanthraquinone.

20. The method of claim 17, wherein reacting said aminoanthrapyridone compound with said organohalogen compound is at a temperature of about 50° C. to about 230° C.

21. The method of claim 17, wherein reacting said aminoanthrapyridone compound with said organohalogen compound is at a temperature of about 50° C. to about 230° C.

* * * * *

UNITED STATES PATENT AND TRADEMARK OFFICE
CERTIFICATE OF CORRECTION

PATENT NO. : 7,655,085 B2
APPLICATION NO. : 11/314866
DATED : February 2, 2010
INVENTOR(S) : Shankarling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Twenty-third Day of November, 2010

David J. Kappos
*Director of the United States Patent and Trademark Office*